US012780861B2

(12) United States Patent
Li et al.

(10) Patent No.: US 12,780,861 B2
(45) Date of Patent: Nov. 3, 2026

(54) PYRAZOLE COBALT-BASED METAL-ORGANIC FRAMEWORK MATERIAL WITH DYNAMIC PORE SIZE, METHOD FOR MAKING THE SAME, AND USE IN SULFUR HEXAFLUORIDE CAPTURE

(71) Applicant: Beijing University of Technology, Beijing (CN)

(72) Inventors: Jianrong Li, Beijing (CN); Yanlong Zhao, Beijing (CN); Xin Zhang, Beijing (CN)

(73) Assignee: Beijing University of Technology, Beijing (CN)

( * ) Notice: Subject to any disclaimer, the term of this patent is extended or adjusted under 35 U.S.C. 154(b) by 47 days.

(21) Appl. No.: 18/940,827

(22) Filed: Nov. 7, 2024

(65) Prior Publication Data

US 2026/0008800 A1 Jan. 8, 2026

(30) Foreign Application Priority Data

Jul. 5, 2024 (CN) ......................... 202410901986.3

(51) Int. Cl.
*C07F 15/06* (2006.01)
*C01B 39/04* (2006.01)

(52) U.S. Cl.
CPC ............ *C07F 15/065* (2013.01); *C01B 39/04* (2013.01); *C01P 2002/08* (2013.01); *C01P 2002/30* (2013.01)

(58) Field of Classification Search
CPC ............... B01D 2253/204; B01D 53/02; B01J 31/1691; B01J 20/226; B01J 31/069; B01J 31/123; C07C 51/418; C08G 83/008; C01P 2002/08
See application file for complete search history.

(56) References Cited

U.S. PATENT DOCUMENTS

2015/0034500 A1* 2/2015 Kim ..................... B01J 20/2808 423/406
2016/0160348 A1* 6/2016 Siu ...................... C23C 16/4402 521/50

FOREIGN PATENT DOCUMENTS

CN 110016145 A * 7/2019 ............ B01J 20/226
CN 110465272 A * 11/2019 ............ B01J 20/226

OTHER PUBLICATIONS

X. Kong et al., 54 Chemical Society Reviews, 3647-3680 (2025) (Year: 2025).*
X. Zhang et al., 146 Journal of the American Chemical Society, 19303-19309 (2024) (Year: 2024).*
Solid State Characterization of Pharmaceuticals (R.A. Storey et al., eds., 2011) (Year: 2011).*
S. Wang et al., 61 Angew. Chem. Int. Ed., 1-7 (2022) (Year: 2022).*
T. He et al., 21 Nature Materials, 689-695 (2022) (Year: 2022).*
First notice of examination opinions Dated Jun. 28, 2025 for corresponding Chinese Application No. 202410901986.3 along its English Translation.

* cited by examiner

*Primary Examiner* — Alexander R Pagano

(57) ABSTRACT

The present disclosure provides a pyrazole cobalt-based metal-organic framework material, a chemical formula of the pyrazole cobalt-based metal-organic framework material is $CoC_{12}H_8N_4$, and the pyrazole cobalt-based metal-organic framework material is named Co-DPB; a ligand of the Co-DPB is 1,3-Di (1-H-pyrazolyl) benzene $H_2$DPB, and a structural formula is

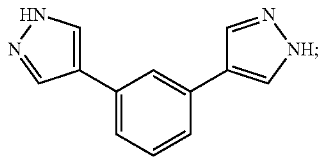

and the Co-DPB is prepared by a solvothermal reaction of an organic ligand $H_2$DPB and a cobalt source; and the Co-DPB is a purple bulk crystal material.

5 Claims, 12 Drawing Sheets

PYRAZOLE COBALT-BASED METAL-ORGANIC FRAMEWORK MATERIAL WITH DYNAMIC PORE SIZE, METHOD FOR MAKING THE SAME, AND USE IN SULFUR HEXAFLUORIDE CAPTURE

CROSS-REFERENCE TO RELATED APPLICATIONS

The present application claims priority of Chinese Patent Application No. 202410901986.3, filed on Jul. 5, 2024, the entire contents of which are hereby incorporated by reference.

TECHNICAL FIELD

The present disclosure relates to the field of a metal-organic coordination polymer crystalline material and gas adsorption, and in particular to a pyrazole cobalt-based metal-organic framework material with a dynamic pore size, a method for making the same, and a use in a sulfur hexafluoride capture.

BACKGROUND

Sulfur hexafluoride ($SF_6$) is widely used as a protective gas in a power industry due to excellent dielectric properties and arc extinguishing performance thereof. However, sulfur hexafluoride also has an extremely strong greenhouse effect, a unit temperature rise capacity is about 23900 times that of carbon dioxide, and sulfur hexafluoride is considered to be a gas with a highest temperature rise capacity at present. Therefore, in order to protect the environment and reduce the greenhouse effect, an emission of sulfur hexafluoride should be controlled as much as possible. In industry, a mainstream method to treat a waste gas containing sulfur hexafluoride is incineration, that is, $SF_6$is calcined and degraded. However, after degradation, other gases that may harm the environment will be produced by $SF_6$, such as hydrofluoric acid (HF), sulfur dioxide ($SO_2$) and the like, which are easy to cause secondary pollution. Another preferable treatment method is to separate sulfur hexafluoride in the waste gas from a main impurity, nitrogen gas ($N_2$), and reuse it after purification. This method can not only effectively reduce the greenhouse effect, but also realize a recycling value of an $SF_6$ gas, thereby reducing a usage cost of $SF_6$.

Existing technologies for separating $SF_6/N_2$ include cryogenic distillation, liquefaction, cryogenic freezing and the like. However, due to a low concentration of $SF_6$ in an industrial waste gas (less than 10%), separation technologies usually have unavoidable disadvantages such as high energy consumption and low purification efficiency.

In contrast, an adsorption separation technology based on porous adsorbents is an efficient and energy-saving purification method. The adsorption separation technology has shown great potential in the field of gas separation. A core of the adsorption separation technology lies in research and development of adsorbents. Conventional porous materials such as zeolite and porous carbon have made initial progress in the field of a sulfur hexafluoride capture as the adsorbents, thereby promoting a development of the field. However, precise control of pore size and pore environment is quite challenging for the porous materials, thereby limiting further improvement of separation performance (adsorption capacity and separation selectivity).

A metal-organic frameworks (MOFs) material is a crystalline porous material with a periodic network structure formed by self-assembly of a metal ion or a metal cluster and an organic ligand through a coordination bond. Advantages of precise control of pore size and pore environment make the MOFs material one of ideal candidate materials in the field of adsorption separation. In view of the above characteristics, MOFs show unique advantages in selective molecular recognition and separation.

Recently, MOFs and other crystalline porous adsorbents demonstrate a feasibility for $SF_6/N$ separation, aiming to reduce $SF_6$ emissions. However, obtaining high-purity $SF_6$ (>99.9%) at the same time as separation faces a greater challenge. To achieve an ultra-high $SF_6/N_2$selectivity, a key is to minimize co-adsorption of $N_2$. In addition, moisture in a gas mixture not only reduces the separation performance due to water co-adsorption, but also causes MOFs to degrade after a plurality of cycles. Currently, the MOFs material with excellent $SF_6/N_2$ separation performance and excellent water resistance have yet to be developed.

SUMMARY

In view of problems existing in the prior art, the present disclosure provides a pyrazole cobalt-based metal-organic framework material with a dynamic pore size, a method for making the same, and a use in a sulfur hexafluoride capture. The present disclosure uses cobalt-based MOFs (Co-DPB) constructed by a bidentate pyrazole ligand ($H_2DPB$) [$H_2DPB$=1,3-Di (1-H-pyrazolyl) benzene] to achieve an efficient $SF_6$ capture. Due to a vibrational flexibility of a benzene ring structure of the bidentate pyrazole ligand $H_2DPB$, the Co-DPB presents a molecular trap structure with a dynamic size (4-8 Å), which is conducive to identifying and capturing sulfur hexafluoride molecules of corresponding size (about 7 Å). In terms of performance, the Co-DPB exhibits an excellent sulfur hexafluoride adsorption capacity (2.82 mmol/g) and an excellent sulfur hexafluoride/nitrogen gas selectivity (2485) at room temperature (25 °C) and even under a low-pressure condition (0.1 bar), surpassing all reported materials. In addition, it can be seen from a dynamic breakthrough separation experiment that a 10% concentration of $SF_6$ can be purified to a concentration higher than 99.9% by a Co-DPB adsorbent through one adsorption and desorption cycle. At the same time, a high-efficiency $SF_6/N_2$ separation ability can be maintained without attenuation through a plurality of breakthrough adsorption-desorption cycles even at a humidity of RH=90%.

The present invention is implemented through the following technical solutions.

A pyrazole cobalt-based metal-organic framework material, a ligand of the pyrazole cobalt-based metal-organic framework material is 1,3-Di (1-H-pyrazolyl) benzene ($H_2DPB$), and a structural formula is

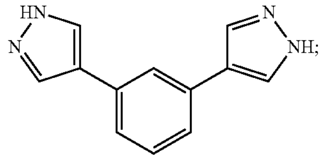 [SMILES: c1cc(-c2cn[nH]c2)cc(-c2cn[nH]c2)c1]

the pyrazole cobalt-based metal-organic framework material is prepared by a solvothermal reaction of an organic ligand $H_2DPB$ and a cobalt source, and is a purple bulk crystal material; and a chemical formula of the pyrazole cobalt-based metal-organic framework material is $CoC_{12}H_8N_4$, and is named Co-DPB.

In some embodiments, analyzing from a perspective of a crystal structure, the Co-DPB belongs to a tetragonal crystal system, a space group is 14$_1$/amd, a unit cell parameter is V=6546.9(3) Å$^3$, a=22.9279(5) Å, b=22.9279(5) Å, c=12.4539(3) Å, $\alpha$=90°, $\beta$=90° and $\gamma$=90°.

In some embodiments, in a framework of the Co-DPB, each cobalt atom is coordinated with four nitrogen atoms in a tetrahedral configuration, coordinated nitrogen atoms are from pyrazole groups of four different ligands, a zigzag metal chain-like secondary building unit (SBU) is formed by adjacent cobalt atoms through a bridged pyrazole group, each nitrogen atom on two pyrazoles of each ligand in the framework of the Co-DPB is involved in coordination, and a three-dimensional framework structure is formed by an alternating connection of the ligand and the zigzag metal chain-like SBU.

In some embodiments, the framework of the Co-DPB is provided with a one-dimensional pore channel with a square shape along a c-axis, a size of the one-dimensional pore channel changes dynamically, and the size of the one-dimensional pore channel ranges from 4 Å to 8 Å; and a cavity is provided on a wall of the one-dimensional pore channel, and a minimum distance of two opposing benzene rings is 2.97 Å.

The present disclosure further provides a synthesis method of the pyrazole cobalt-based metal-organic framework material, comprising the following steps:

step (1): dissolving the organic ligand $H_2$DPB and $Co(CH_3COO)_2$ in a mixed solvent of N,N-dimethylformamide (DMF), acetic acid and water, to obtain a mixed solution; and step (2): ultrasonic shaking and stirring of the mixed solution in the step (1), then performing the solvothermal reaction to obtain a bulk single crystal; and then washing with DMF and methanol successively to obtain a sample.

In some embodiments, a molar ratio of the organic ligand $H_2$DPB to the $Co(CH_3COO)_2$ is 1:1 to 2;

a volume ratio of the DMF, the water and the acetic acid in the mixed solvent is 100:80 to 90:1 to 3; and a ratio of a solvent volume (mL) corresponding to each millimole of organic ligand is 1:125 to 140.

In some embodiments, a temperature of the solvothermal reaction is 130 °C to 160 °C, and a reaction time is 8 hours to 16 hours.

The present disclosure further provides a use of the pyrazole cobalt-based metal-organic framework material (Co-DPB) in $SF_6$ capture.

In some embodiments, after the Co-DPB is washed by DMF and is solvent exchanged with methanol, and then is heated in vacuum at 120 °C to remove solvent molecules, the Co-DPB is used to adsorb $SF_6$.

In some embodiments, the pyrazole cobalt-based metal-organic framework material is used to selectively adsorb and separate $SF_6/N_2$.

In some embodiments, the pyrazole cobalt-based metal-organic framework material is used to adsorb $SF_6$ under a relative humidity ranging from 0 to 90%.

In some embodiments, the pyrazole cobalt-based metal-organic framework material is used to adsorb $SF_6$ at room temperature and under a pressure ranging from 0.1 bar to 1.0 bar.

In some embodiments, the pyrazole cobalt-based metal-organic framework material is recyclable for reuse after desorption.

Beneficial effects of the present disclosure are as follows.

(1) In a structure of the Co-DPB, the one-dimensional pore channel with the square shape is provided along the c-axis, and the cavity is provided on the wall of the one-dimensional pore channel, dynamic properties of the framework are introduced by a swinging motion of a phenyl ring in the $H_2$DPB ligand, and a minimum distance observed from a disordered position thereof is 2.97 Å. Flexibility of the ligand allows a pore channel size to change from about 4 Å to 8 Å, thereby facilitating an accommodation of guest molecules with different sizes. Specifically, after $SF_6$ is adsorbed, the pore channel size is about 7 Å, and the ligand does not have any disorder.

(2) After the Co-DPB is washed by DMF and is solvent exchanged with methanol, and then is heated in vacuum at 120 °C to remove solvent molecules, the Co-DPB can be used to adsorb $SF_6$, and in particular the Co-DPB is used to selectively adsorb and separate $SF_6/N_2$. The Co-DPB material has a strong binding ability with $SF_6$ and still exhibits a high $SF_6$ adsorption amount (2.82 mmol/g at 298K) at a low pressure of 0.1 bar, and an $SF_6/N_2$selectivity (2485) is achieved, surpassing all reported materials.

(3) In terms of dynamic molecular capture, the Co-DPB material still has excellent $SF_6/N_2$ separation performance. Through a desorption experiment, a recovery of high-purity $SF_6$(>99.9%) can be achieved by the Co-DPB material, and the high-purity (>99.9%) $SF_6$ can be recovered even from a low concentration gas mixture (10%).

(4) Under the condition of RH=90%, the Co-DPB material still maintains excellent $SF_6/N_2$ separation performance after a plurality of cycles, thereby showing that the Co-DPB material has potential for practical separation applications under a humid condition.

(5) The CO-DPB material can maintain structural integrity even after being repeatedly exposed to a high-humidity environment, thereby indicating excellent stability thereof.

DESCRIPTION OF EMBODIMENTS

Figure 1:
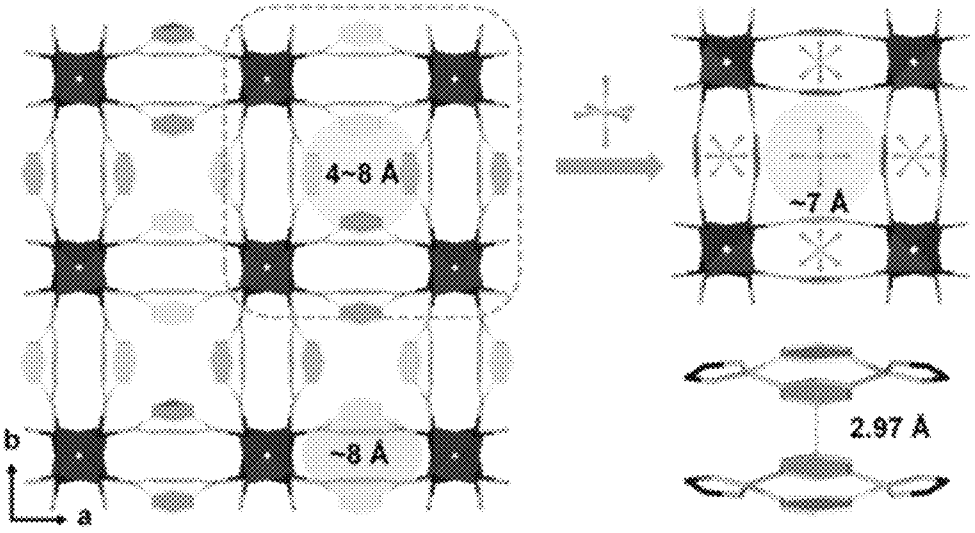
FIG. 1 is a schematic view of a dynamic pore channel of a CO-DPB material obtained in Example 1 and a pore channel after adsorbing sulfur hexafluoride molecules.

The present disclosure is described clearly below in conjunction with embodiments, apparently, the present disclosure is not limited to the following embodiments.

Example 1

Dissolving $H_2DPB$ (0.14 mmol, 30 mg) and $Co(OAc)_2{\cdot}4H_2O$ (0.24 mmol, 60 mg) in 10 mL DMF, then placing in a 20 mL glass vial, and dissolving under ultrasound, to obtain a mixture. Then, adding 0.10 mL acetic acid and 8.0 mL deionized water to the mixture. Sealing the glass vial, and then stirring for another 30 minutes under ultrasound, to obtain a suspension. Heating the suspension at 150 °C for 12 hours. Cooling to room temperature, then filtering to obtain blue-purple crystals, and washing the blue-purple crystals with DMF and methanol to remove amorphous solids. Collecting crystals by filtration, and drying under vacuum at 80 °C for 6 hours.

Example 2

Dissolving $H_2DPB$ (0.14 mmol, 30 mg) and $Co(OAc)_2{\cdot}4H_2O$ (0.28 mmol,70 mg) in 10 mL DMF, then placing in a 20 mL glass vial, and dissolving under ultrasound, to obtain a mixture. Then, adding 0.30 mL acetic acid and 9.0 mL deionized water to the mixture. Sealing the glass vial, and then stirring for another 30 minutes under ultrasound, to obtain a suspension. Heating the suspension at 160 °C for 8 hours. Cooling to room temperature, then filtering to obtain blue-purple crystals, and washing the blue-purple crystals with DMF and methanol to remove amorphous solids. Collecting crystals by filtration, and drying under vacuum at 80° C. for 6 hours.

Example 3

Dissolving $H_2DPB$ (0.14 mmol, 30 mg) and $Co(OAc)_2{\cdot}4H_2O$ (0.28 mmol, 35 mg) in 10 mL DMF, then placing in a 20 mL glass vial, and dissolving under ultrasound, to obtain a mixture. Then, adding 0.20 mL acetic acid and 8.0 mL deionized water to the mixture. Sealing the glass vial, and then stirring for another 30 minutes under ultrasound, to obtain a suspension. Heating the suspension at 130 °C for 16 hours. Cooling to room temperature, then filtering to obtain blue-purple crystals, and washing the blue-purple crystals with DMF and methanol to remove amorphous solids. Collecting crystals by filtration, and drying under vacuum at 80° C. for 6 hours.

An elemental analysis on Co-DPB obtained in Example 1 is performed, and results are: $C_{12}H_8N_4Co$(267.15 g/mmol). Calculated value (%): C, 53.93; H, 3.00; N, 20.97; and actual measurement value: C, 52.63; H, 3.41; N, 20.01.

Crystal data of the Co-DPB obtained in Example 1 are shown in following Table 1:

TABLE 1

| | |
|---|---|
| Empirical formula | $C_{12}H_8N_4Co$ |
| Measurement temperature | 294.15 |
| Crystal system | Tetragonal |
| Space group | $I4_1/amd$ |
| a(Å) | 22.9279(5) |
| b(Å) | 22.9279(5) |
| c(Å) | 12.4539(3) |
| α(°) | 90 |
| β(°) | 90 |
| γ(°) | 90 |
| Volume($Å^3$) | 6546.9(3) |
| Z | 16 |
| Calculated density($g/cm^3$) | 1.082 |
| Independent reflections($I > 2\sigma(I)$) | 1736 [$R_{int}$ = 0.0547] |
| Reflections collected | 15528 |
| Goodness-of-fit on $F^2$ | 1.084 |
| $R_1^a$, $wR_2^b$[$I > 2\sigma(I)$] | $R_1$ = 0.0681, $wR_2$ = 0.1799 |
| $R_1^a$, $wR_2^b$ (all data) | $R_1$ = 0.0733, $wR_2$ = 0.1835 |
| Largest diff. peak and hole(e/$Å^3$) | 0.29/−0.34 |

FIG.1 is a schematic view of a dynamic pore channel of a metal-organic framework material prepared in Example 1 and a pore channel after adsorbing sulfur hexafluoride molecules. In a structure of the Co-DPB, a one-dimensional pore channel with a square shape is provided along a c-axis, and a cavity is provided on a wall of the one-dimensional pore channel, dynamic properties of the framework are introduced by a swinging motion of a phenyl ring in the $H_2DPB$ ligand, and a minimum distance observed from a disordered position thereof is 2.97 Å. Flexibility of the ligand allows a pore channel size to change from about 4 Å to 8 Å, thereby facilitating an accommodation of guest molecules of different sizes. Specifically, after $SF_6$ is adsorbed, the pore channel size is fixed at about 7 Å, and the ligand does not have any disorder.

Figure 2:
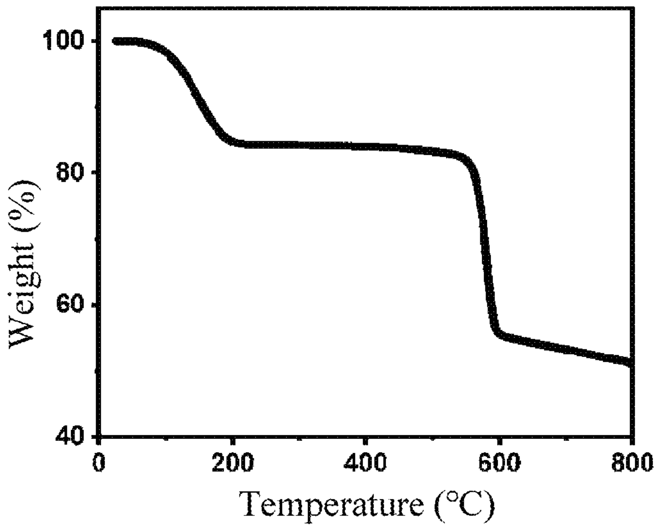
FIG. 2 is a thermal analysis diagram of the CO-DPB material obtained in Example 1.

FIG. 2 is a thermal analysis diagram of an activated metal-organic framework material, which proves that the Co-DPB has high thermal stability, and no obvious collapse of an MOF framework structure is observed before 570 °C. A mass loss before 200 °C is speculated to be a removal of the guest molecules in the pore channel.

Figure 3:
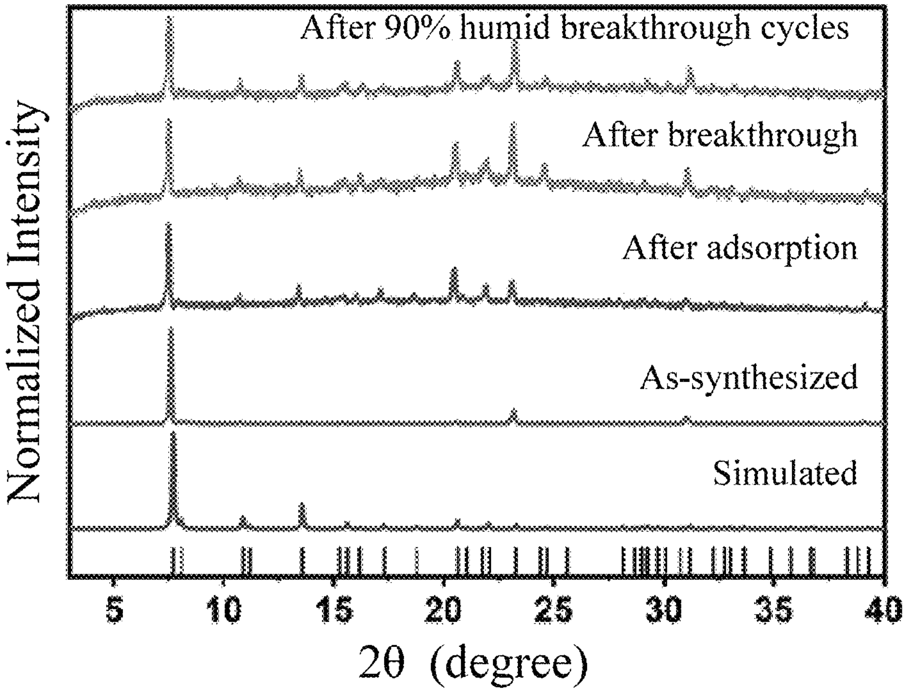
FIG. 3 is a powder diffraction pattern of a fresh synthetic sample of the CO-DPB material obtained in Example 1 and a sample after an adsorption/breakthrough test.

FIG. 3 is a powder diffraction pattern of the metal-organic framework material, showing that the structure of the Co-DPB has excellent stability and still maintains excellent crystallinity after an adsorption/penetration test, and the structure does not collapse significantly.

Example 4: A Gas Adsorption Performance Test

Figure 4:
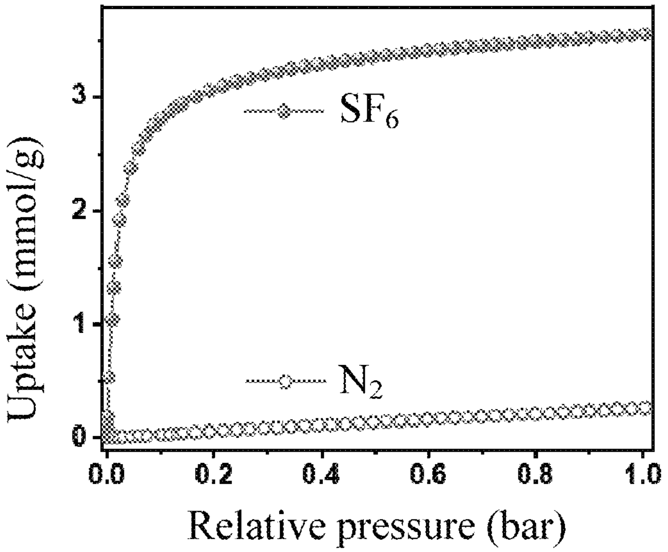
FIG. 4 is an adsorption isotherm diagram of sulfur hexafluoride and a nitrogen gas of the CO-DPB material obtained in Example 1 at room temperature.

A porosity of the Co-DPB is evaluated by a nitrogen gas adsorption experiment at 77 K. A specific surface area calculated by a Brunauer-Emmett-Teller (BET) method is 866 $m_2/g$, single component adsorption isotherms of the Co-DPB at 298K and 273K show significant $SF_6$ adsorption capacity thereof, while adsorption of $N_2$ is almost negligible, as shown in FIG. 4. At 298K, the $SF_6$ adsorption capacity of the Co-DPB at 0.1 bar is 2.82 mmol/g, and 3.55 mmol/g at 1 bar. In contrast, the adsorption of $N_2$ by the Co-DPB at 298K is negligible (0.262 mmol/g).

Figure 5:
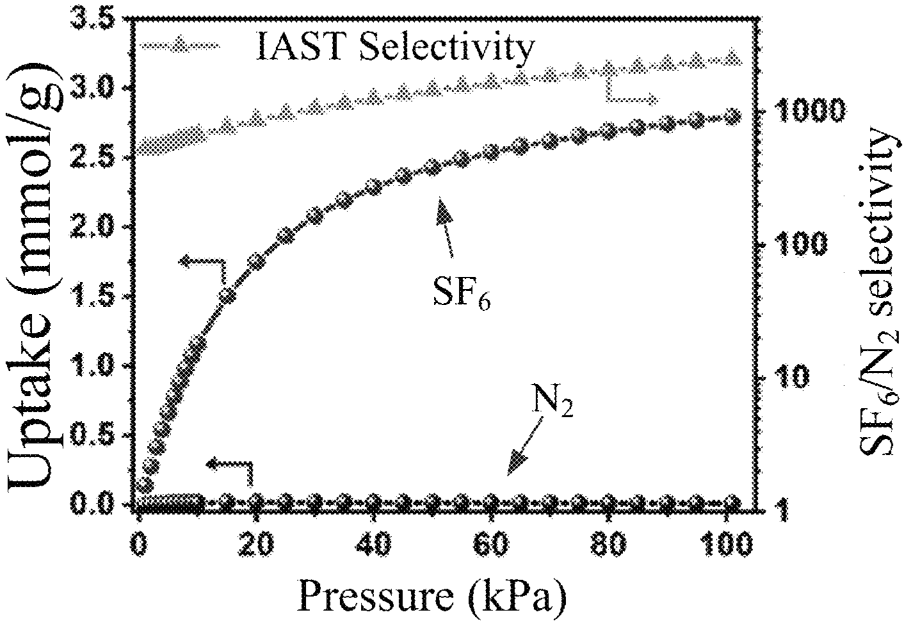
FIG. 5 is adsorption isotherms of an $SF_6/N_2$ selectivity of the CO-DPB material obtained in Example 1 and an $SF_6/N_2$ gas mixture (1:9) predicted by an ideal adsorption solution theory (IAST).

In addition, based on the single component adsorption isotherms, a selectivity of $SF_6/N_2$ is evaluated using an ideal adsorption solution theory (IAST). Simulated mixed adsorption isotherms of the $SF_6/N_2$ gas mixture (1:9) in FIG. 5 show that as a pressure increases, the adsorption capacity of $SF_6$ gradually increases, while the adsorption capacity of $N_2$ remains very low throughout an entire pressure range. Therefore, an IAST selectivity gradually increases and reaches a maximum value of 2485 at 1 bar ($SF_6/N_2$=10:90). The selectivity significantly exceeds selectivities of all porous materials reported so far, thereby making the CO-DPB a highly potential material for directly recovering high-purity $SF_6$ through desorption, and specific results are shown in Table 2.

TABLE 2

Comparison of $SF_6/N_2$ separation performance between BUT-53 and other reported porous adsorbents at 298K and 1 bar.

| Adsorbents | $SF_6$ uptake at 0.1 bar (mmol/g) | $N_2$ uptake at 1 bar (mmol/g) | $SF_6/N_2$ selec-tivity (v/v, 10/90) | Qst for $SF_6$ (kJ/mol) | Qst for $N_2$ (kJ/mol) | Ref. |
|---|---|---|---|---|---|---|
| BUT-53 | 2.82 | 0.26 | 2484.8 | 23.8 | 20.4 | This work |
| $Ni(NDC)(TED)_{0.5}$ | 2.73 | 0.27 | 750 | 34.1 | 13.1 | 16 |
| $Cu-MOF-NH_2$ | 3.39 | 0.28 | 266.2 | 55.2 | 19.1 | 17 |
| $Ni(adc)(dabco)_{0.5}$ | 2.23 | 0.30 | 948.2 | 47.6 | 19.4 | 18 |
| Ga-TCPB | 2.26 | 0.32 | 418.5 | 30.44 | — | 19 |
| V-TCPB | 2.29 | 0.40 | 360.7 | 30.48 | — | 19 |
| $Zn(TMBDC)(DABCO)_{0.5}$ | 2.51 | 0.33 | 239 | 45.2 | 24.6 | 20 |
| $Ni(ina)_2$ | 2.39 | 0.54 | 375.1 | 33.4 | 16.1 | 21 |
| HKUST-1 | 1.12 | — | 70.4 | 9.5 | — | 22 |

Figure 6A:
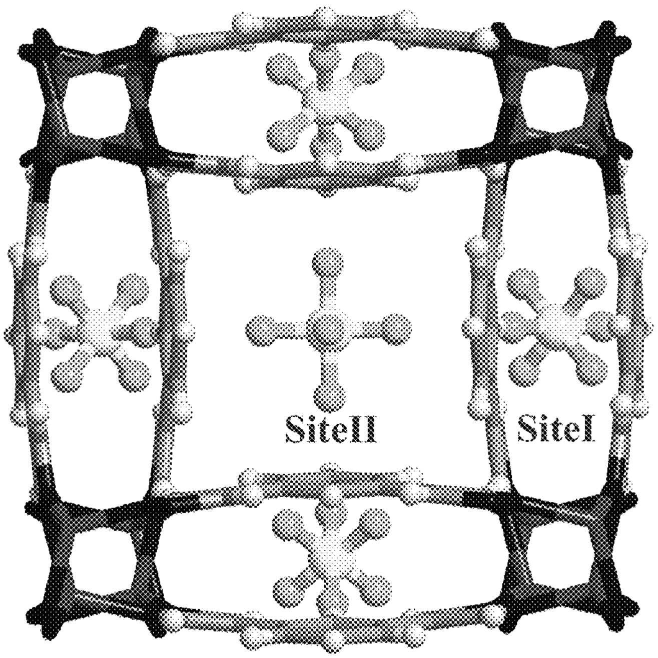
FIG. 6A is two types of adsorption sites in a crystal structure of $SF_6$@CO-DPB.
Figure 6B:
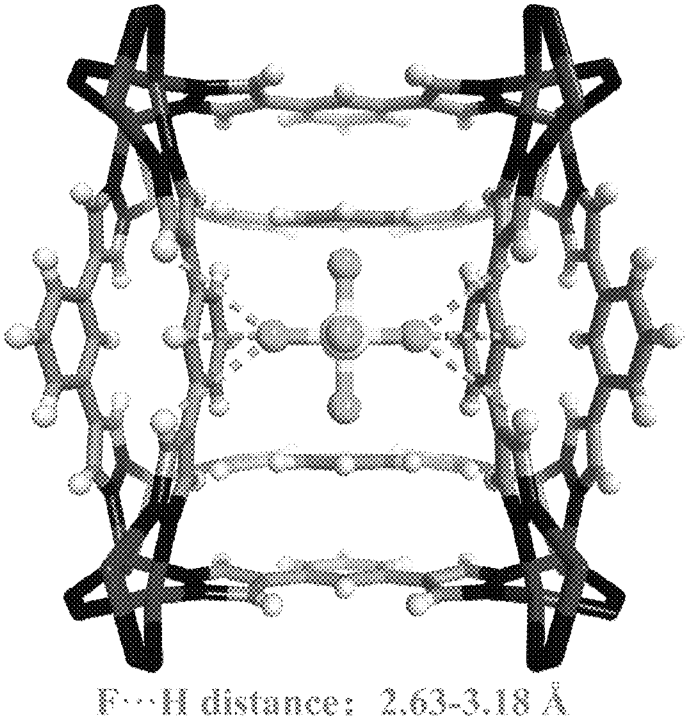
FIG. 6B is an F•••H interaction at an $SF_6$ binding site (site I) in a cavity of a wall structure of a pore channel.
Figure 6C:
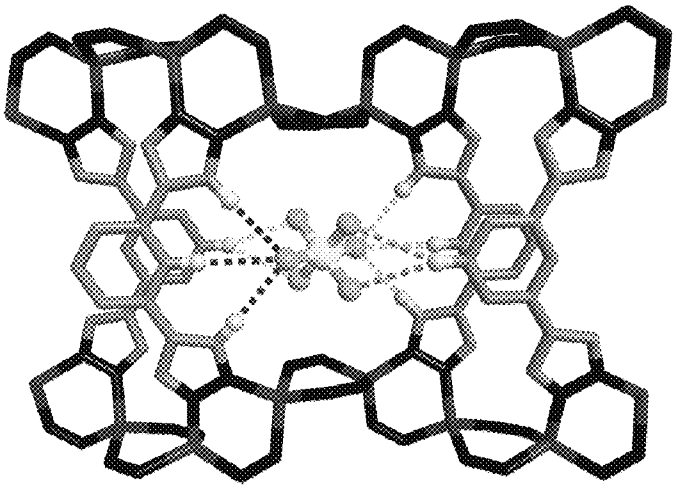
FIG. 6C is an F•••H interaction at a secondary $SF_6$ binding site (site II) in the pore channel.

As shown in FIG. 6A, there are two $SF_6$ binding sites in the CO-DPB structure. As shown in FIG. 6B, a main adsorption site of $SF_6$ (site I) is located in the cavity of the wall structure of the pore channel, at the site, a plurality of F•••H interactions are mainly formed through hydrogen atoms on the benzene ring and pyrazole ring of four $DPB^{2-}$ ligands and six fluorine atoms of $SF_6$, to achieve the capture of $SF_6$, and an occupancy rate of the site is relatively high. Specifically, strong F•••H interactions (F•••H distance: 2.65-2.89 Å) are formed at the site by two axial fluorine atoms of an $SF_6$ molecule with six hydrogen atoms, while relatively weak F•••H interactions (F•••H distance is about 3.15 Å) are formed by four equatorial fluorine atoms. In addition, the one-dimensional pore channel of the CO-DPB framework is a secondary binding site (site II) (FIG. 6C), at the site, only the two axial fluorine atoms of the $SF_6$ molecule participate in the plurality of F•••H interactions (F•••H distance: 2.63-3.18 Å), therefore, an occupancy rate of the site is relatively low.

Example 5: Research on the Dynamic Separation Performance of the CO-DPB Under a Condition Simulating Actual Applications A column breakthrough separation experiment is carried out using the $SF_6/N_2$ gas mixture. Specific operations are as follows: a gas separation experiment is carried out using a fixed-bed breakthrough device. A CO-DPB sample is added into a quartz glass column, and an $SF_6/N_2$ gas mixture with a volume ratio of 10:90 is flowed through the quartz glass column at a total flow rate of 10 mL $min^{-1}$.

Figure 7A:
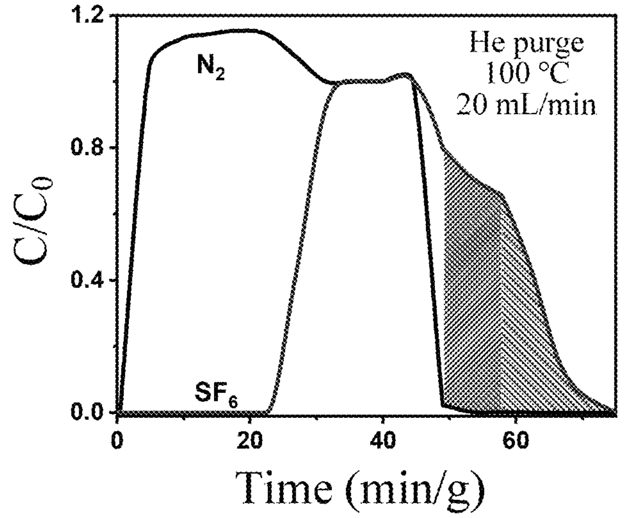
FIG. 7A is a breakthrough curve of the CO-DPB material and a purity of $SF_6$ calculated from desorption.

As shown in FIG. 7A, $N_2$ passes through the quartz glass column quickly, while a breakthrough time of $SF_6$ is 23 min/g, indicating that the CO-DPB has a higher selective adsorption capacity for $SF_6$ than $N_2$, thereby confirming an efficient separation ability of the CO-DPB for the $SF_6/N_2$ gas mixture. After the column breakthrough separation experiment, a desorption experiment of the CO-DPB is carried out by helium purge at 100 °C, in an initial stage of desorption, the concentration of $SF_6$ remains at a high level (49-58 min), and then the concentration of $SF_6$decreases rapidly (FIG. 7A). This step-wise desorption behavior is attributed to a rapid desorption of weakly bound $SF_6$ molecules, and followed by a slow desorption of strongly bound $SF_6$ molecules.

Quantitative analysis of a desorption curve shows that $SF_6$ with a purity greater than or equal to 99.9% can be obtained, and a yield is 8.4 mL/g. This is the first time that $SF_6$ with such high purity is obtained through the adsorption separation, thereby indicating the high selectivity of the CO-DPB. After an adsorbent is fully activated, a breakthrough curve shows consistent performance in at least five cycle tests without significant degradation, and the separation performance and structural stability of the CO-DPB remain unchanged, thereby fully verifying excellent cyclic regeneration ability thereof.

Figure 7B:
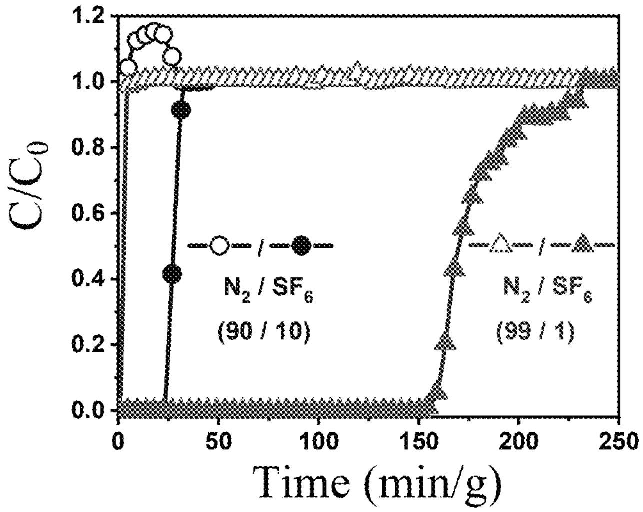
FIG. 7B is a breakthrough separation result diagram of an $SF_6/N_2$ (10/90 and 1:99) gas mixture.

In addition, the CO-DPB still performs excellently in capturing trace amounts of $SF_6$. A breakthrough experiment is carried out using an $SF_6/N_2$ gas mixture with a volume ratio of 99:1, a breakthrough time of $SF_6$ is as long as 152 min/g, thereby obtaining a high-purity nitrogen gas (>99.99%) (FIG. 7B).

Figure 7C:
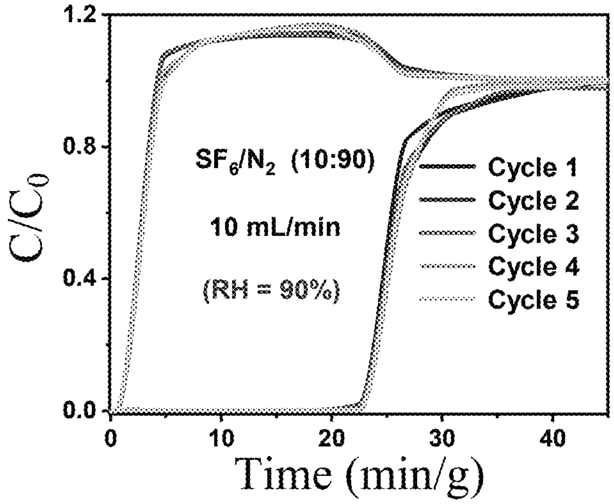
FIG. 7C is breakthrough separation results of five cycles of the $SF_6/N_2$ (10/90) gas mixture at 90% relative humidity (RH).

As shown in FIG. 7C, under a condition of a relative humidity (RH) of 90%, the separation performance of the CO-DPB is almost identical to that under dry conditions. In addition, in five cycle breakthrough experiments carried out by the CO-DPB under the condition of RH=90%, the $SF_6/N_2$ separation efficiency remains consistent, further proving the stability of the separation performance of the CO-DPB in a humid environment.

Figure 8A:
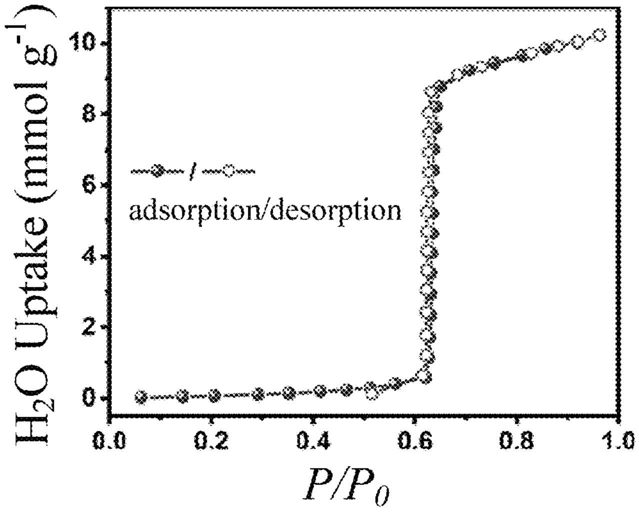
FIG. 8A is water vapor adsorption/desorption isotherms of the CO-DPB material.
Figure 8B:
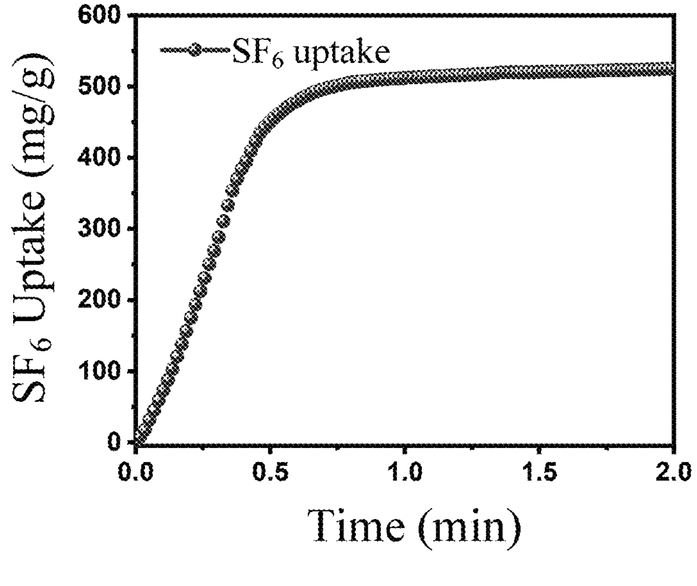
FIG. 8B is a kinetic adsorption curve of $SF_6$ of the CO-DPB material.
Figure 8C:
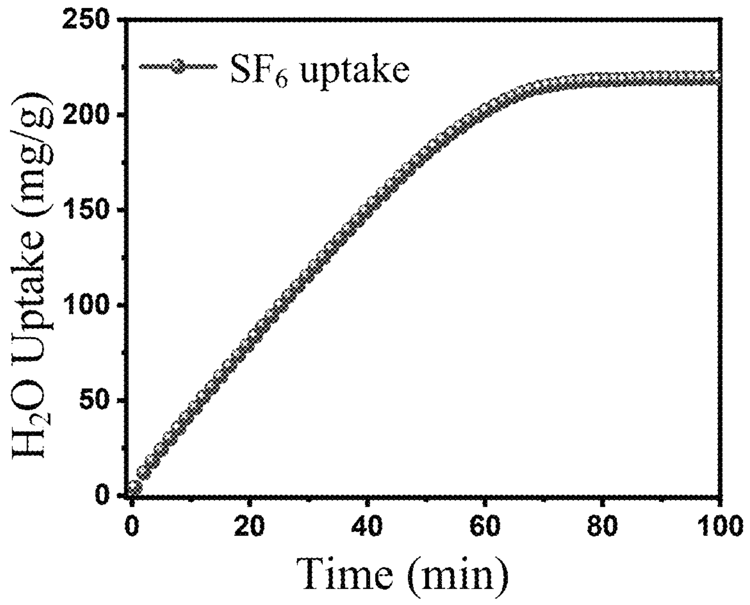
FIG. 8C is a kinetic adsorption curve of $H_2O$ of the CO-DPB material.
Figure 8D:
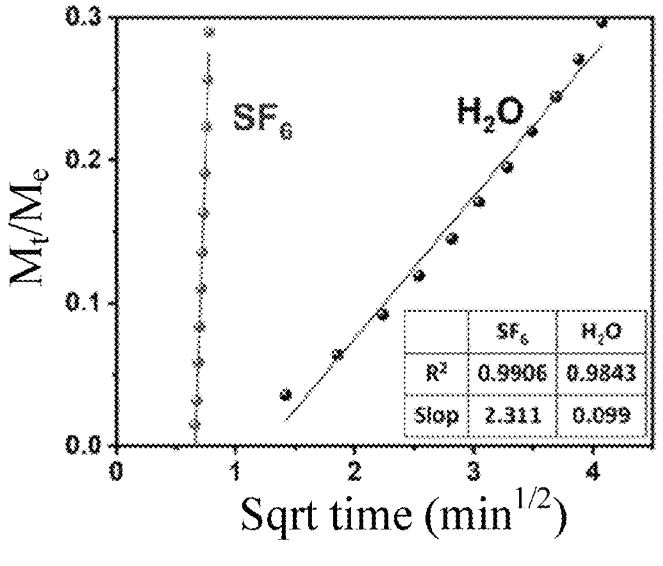
FIG. 8D is fitting of diffusion time constants for $SF_6/H_2O$ kinetic selectivity calculation.

FIG. 8A is a water vapor adsorption isotherm of the CO-DPB, showing that before a relative pressure (P/PO) reaches 0.62, an adsorption amount of water is very small, indicating that an affinity for water is low thereof, which is in sharp contrast to an adsorption isotherm of $SF_6$, the adsorption isotherm of $SF_6$ shows significant adsorption even at a low pressure. In addition, adsorption kinetics of water and $SF_6$ are studied, and results are shown in FIGS. *8b* and *8c*, an adsorption rate of $SF_6$ under a condition of 90% relative humidity (RH) is significantly higher than an adsorption rate of water. A kinetic selectivity of $SF_6$/water reaching 545 is concluded through fitting the diffusion time constants, referring to FIG. 8D, a co-adsorption of water throughout a separation process is effectively reduced by slow water-adsorption kinetics combined with a high kinetic selectivity of $SF_6$/water.

Figure 9A:
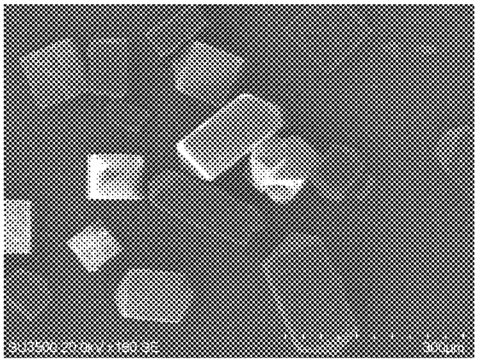
FIG. 9A is an SEM image of a CO-DPB sample before a breakthrough experiment under a humid condition.
Figure 9B:
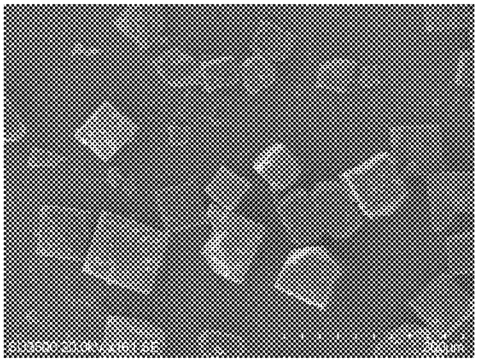
FIG. 9B is an SEM image of the CO-DPB sample after the breakthrough experiment under the humid condition.

In order to evaluate a retention situation of the structure after the breakthrough experiment, a plurality of characterization analyses such as SEM and PXRD are carried out. SEM measurements show that a crystal morphology remains substantially intact after the breakthrough experiment carried out under a humid condition (FIG. 9A and FIG. 9B). A PXRD spectrum shows that the sample still maintains excellent crystallinity even after the breakthrough experiment. $N_2$ adsorption and BET surface area of the CO-DPB sample at 77 K show almost no change after adsorption and breakthrough experiments (FIG. 3). These results show that the CO-DPB sample can maintain structural integrity even after repeated exposure to a high-humidity environment, further demonstrating the excellent stability thereof.

The present disclosure uses a process of a pyrazole-based metal-organic framework (MOF) CO-DPB for recovering greenhouse gas $SF_6$ from the $SF_6/N_2$ gas mixture, the CO-DPB can achieve $SF_6$ purity recovery exceeding 99.9%, and this result is attributed to a high $SF_6/N_2$ selectivity of up to 2485 thereof. Superior performances of the CO-DPB are attributed to an excellent $SF_6$ capture capacity thereof, resulting from the one-dimensional pore channel with the square shape and the cavity provided on the wall of the one-dimensional pore channel of the structure therein, which can optimally accommodate $SF_6$ molecules. In addition, the CO-DPB exhibits excellent moisture resistance ability and stability after a plurality of cycles in a dynamic breakthrough experiment, which is due to a high $SF_6/H_2O$ kinetic selectivity of the CO-DPB and inherent hydrophobicity of a pore surface of the CO-DPB.

The invention claimed is:

1. A method for $SF_6/N_2$ separation using a Co (II)-based metal-organic framework material constructed with a pyrazole ligand, comprising:

providing the metal-organic framework material which is a purple bulk crystal material prepared by a solvothermal reaction of an organic ligand $H_2DPB$ and a cobalt source, with a chemical formula of $CoC_{12}H_8N_4$ and named Co-DPB, wherein $H_2DPB$ is 1,3-di (1H-pyrazol-4-yl) benzene with a molecular formula of $C_{12}H_{10}N_4$;

wherein from a perspective of a crystal structure, the Co-DPB belongs to a tetragonal crystal system, a space group is I4$_1$/amd, a unit cell parameter is V=6546.9(3) Å3, a=22.9279(5)Å, b=22.9279(5)Å, c=12.4539(3)Å, α=90°, β=90° and γ=90°;

wherein in a framework of the Co-DPB, each cobalt atom is coordinated with four nitrogen atoms in a tetrahedral configuration, those coordinated nitrogen atoms are from pyrazole groups of four different ligands, each nitrogen atom on two pyrazoles of each ligand in the framework of the Co-DPB is involved in coordination, a zigzag metal chain-like secondary building unit (SBU) is formed by adjacent metal atoms through a bridged pyrazole group, and a three-dimensional framework structure is formed by an alternating connection of the ligand and the zigzag metal chain-like SBU;

wherein the Co-DPB is provided with a pore channel, a size of the pore channel changes dynamically and ranges from 4 Å to 8 Å;

carrying out the $SF_6/N_2$ separation under a condition of a relative humidity ranging from 0 to 90%; and desorbing the Co-DPB adsorbed with SF6 by helium purge for reuse.

2. The method of claim 1, wherein a synthesis method of Co-DPB comprises:

step (1): dissolving the organic ligand $H_2DPB$ and $Co(CH_3COO)_2$ in a mixed solvent of N,N-dimethylformamide (DMF), acetic acid and water, to obtain a mixed solution; and step (2): ultrasonic shaking and stirring of the mixed solution in the step (1), then performing the solvothermal reaction to obtain a bulk single crystal; and then washing the bulk single crystal with DMF and methanol successively.

3. The method of claim 2, wherein a temperature of the solvothermal reaction is in a range of 130 °C to 160 °C, and a reaction time is in a range of 8 hours to 16 hours.

4. The method of claim 1, wherein after the Co-DPB is washed by DMF and is solvent exchanged with methanol, and then is heated in vacuum at 120 °C to remove solvent molecules, the Co-DPB is used to adsorb $SF_6$.

5. The method of claim 1, wherein the separation is carried out at room temperature and under a pressure ranging from 0.1 bar to 1.0 bar.

* * * * *